United States Patent [19]
Anselment et al.

[11] Patent Number: 5,844,708
[45] Date of Patent: Dec. 1, 1998

[54] LIGHT BEAD GENERATING APPARATUS

[75] Inventors: Christoph Anselment, Freiburg; Heinrich Hippenmeyer, Freiamt, both of Germany, .

[73] Assignee: Sick AG, Waldkirch/Breisgau, Germany

[21] Appl. No.: 820,204

[22] Filed: Mar. 19, 1997

[30] Foreign Application Priority Data

Mar. 29, 1996 [DE] Germany ............... 196 12 710.6

[51] Int. Cl.⁶ .................................................. G02B 26/08
[52] U.S. Cl. ........................ 359/210; 359/207; 359/208
[58] Field of Search .................................. 359/205, 207, 359/208–210, 710, 867, 319

[56] References Cited

U.S. PATENT DOCUMENTS

| | | | |
|---|---|---|---|
| 4,116,527 | 9/1978 | Sick | 359/208 |
| 5,054,866 | 10/1991 | Tomita et al. | 359/210 |
| 5,469,290 | 11/1995 | Maeda | 359/210 |
| 5,610,758 | 3/1997 | Sumi | 359/207 |

*Primary Examiner*—James Phan
*Attorney, Agent, or Firm*—Townsend and Townsend and Crew LLP

[57] ABSTRACT

A light bead generating apparatus has a point light source (11) and a variable optical system (12, 13) of variable focal length, by means of which the point light source (11) is imaged via a light deflecting apparatus (24) in an image plane (14). The variable optical system is formed by two circular cylindrical mirrors (12', 13') which are crossed relative to one another, which have variable focal lengths in the direction of their circular cylinder axes (17', 18') and which are adjustable. They are illuminated by the image forming light beam (19, 19') in the direction of the optical axes (15).

21 Claims, 4 Drawing Sheets

LIGHT BEAD GENERATING APPARATUS

FIELD OF THE INVENTION

The invention relates to a light bead generating apparatus, having a point light source and a variable optical system of variable focal length by means of which the point light source is imaged, preferably via a light deflecting device such as a mirror wheel, at an image surface with a magnification scale predetermined by the variable optical system.

DESCRIPTION OF PRIOR ART

Such light bead generating apparatuses are generally used in scanning apparatuses where a light beam, in particular a laser beam, is deflected onto a surface to be scanned, for example by means of a mirror wheel, and there generates a light bead, in particular a circular light bead, which executes a periodic scanning movement. The light deflecting apparatus can thereby preferably generate a V-shaped scanning movement of the light beam (DE patent 36 00 578), preferably via an F-θ-objective, or can generate a scanning beam (DE-PS 23 40 688) which is displaced parallel to itself by means of a concave mirror.

With scanning problems, where the surfaces to be scanned, for example code markings applied to articles, can be arranged at very different distances from the light bead generating apparatus, the light bead which is set to be sharp on the surface of the image surface has a greatly differing size, depending on the spacing of the image surface from the light deflecting apparatus. However, since it is important when scanning codes consisting, for example, of bars, that the size of the light bead has a predetermined relationship to the width of the code bars, one has already formed an image of the point light source by means of a variable optical system, i.e. an optical system of variable focal length, on the image surface (U.S. Pat. No. 4,920,255). This makes it possible to always generate the same size of light bead on the image surface, independently of the distance between the light deflecting apparatus and the image surface. Known variable objectives consist of a plurality of lenses which are arranged to be displaceable relative to one another in the direction of the optical axis in order to be able to change the focal length. Such variable objectives are, however, costly, and above all take up a lot of space in the direction of the optical axis, because the space for the axial displacement of the lenses must be available.

OBJECT OF THE INVENTION

The object of the present invention is to provide a light bead generating apparatus of the initially named kind with which light beads of different size and preferably also of different shape can be generated at the image surface without using a plurality of lenses which are displaceable relative to one another in the direction of the optical axis.

SUMMARY OF THE INVENTION

In order to satisfy this object there is provided an apparatus of the initially named kind which is characterized in that the variable optical system is formed by two crossed cylindrical optical systems with variable focal length in the direction of their cylindrical axes which are displaceably connected in the direction of their cylinder axes and are sequentially illuminated by image forming light beams at points where the cylinder axes of the two cylindrical optical systems stand optically perpendicular to one another.

The concept underlying the invention is thus to be seen in the fact that two cylindrical optical systems, which are crossed in the area of the beam path are used in place of a spherical or parabolic optical system. The change of the focal length is effected in that each cylindrical optical system is equipped with different focal lengths along its cylinder axis so that different focal lengths can be realized without problem by a shift of the two cylindrical optical systems in the direction of their cylinder axes which are crossed in the region of the light passage, i.e. perpendicular to the optical axis. It has proved to be particularly advantageous that the two cylindrical optical systems can indeed have the same focal length at the points where they are struck by the image forming light beam, so that on the whole they act in the same way as a parabolic or spherical optical system, but can also have different focal lengths, so that elliptical light beads with different eccentricities can also be generated in place of a circular light bead. When arranging the two cylindrical optical systems relative to one another, attention should merely be paid to the fact that the cylinder axes stand at least substantially perpendicular to one another at the points where they are illuminated by the image forming light beam, so that the two cylindrical optical regions at these points jointly have the effect of a parabolic or spherical optical system.

The cylindrical optical systems can be cylindrical lenses or cylindrical mirrors. Cylindrical mirrors are, however, preferred for manufacturing reasons.

Furthermore, the cylindrical optical systems can be straight or circular. The circular shape is preferred for space reasons and also to achieve simple adjustability. In this respect, very many different cylindrical lens focal lengths can be accommodated in compact manner on a circular disc in accordance with claim 6. By arranging the disc on a rotary shaft the setting of different focal lengths can, moreover, take place without problem.

At each point of the cylindrical optical systems the optical axes can be arranged along the cylinder axis relative to the axis of rotation.

A particularly preferred embodiment facilitates the manufacture of the circular, cylindrical mirror disc by an injection molding process. The mold half of the injection mold which forms the cylindrical mirror can thus be withdrawn in the direction of the axis of rotation in simple manner from the cylindrical mirror after it has been injection molded.

With the apparatus of the invention it is ultimately possible to effect any desired changes of focal length along the cylindrical axis.

If a continuous increase or decrease of the focal length takes place around the total circumference of the circular disc, then a step-like change of the focal length results at one point of the circumference.

Manufacture is made easier, while the optical accuracy required for the generation of a sharp light bead is ensured.

Another embodiment is advantageous for realizing space saving folded beam paths, in particular when using cylindrical mirrors.

BRIEF DESCRIPTION OF THE DRAWINGS

The invention will be described in the following by way of example only and with reference to the drawings, in which are shown.

DESCRIPTION OF PREFERRED EMBODIMENTS

Figure 1:
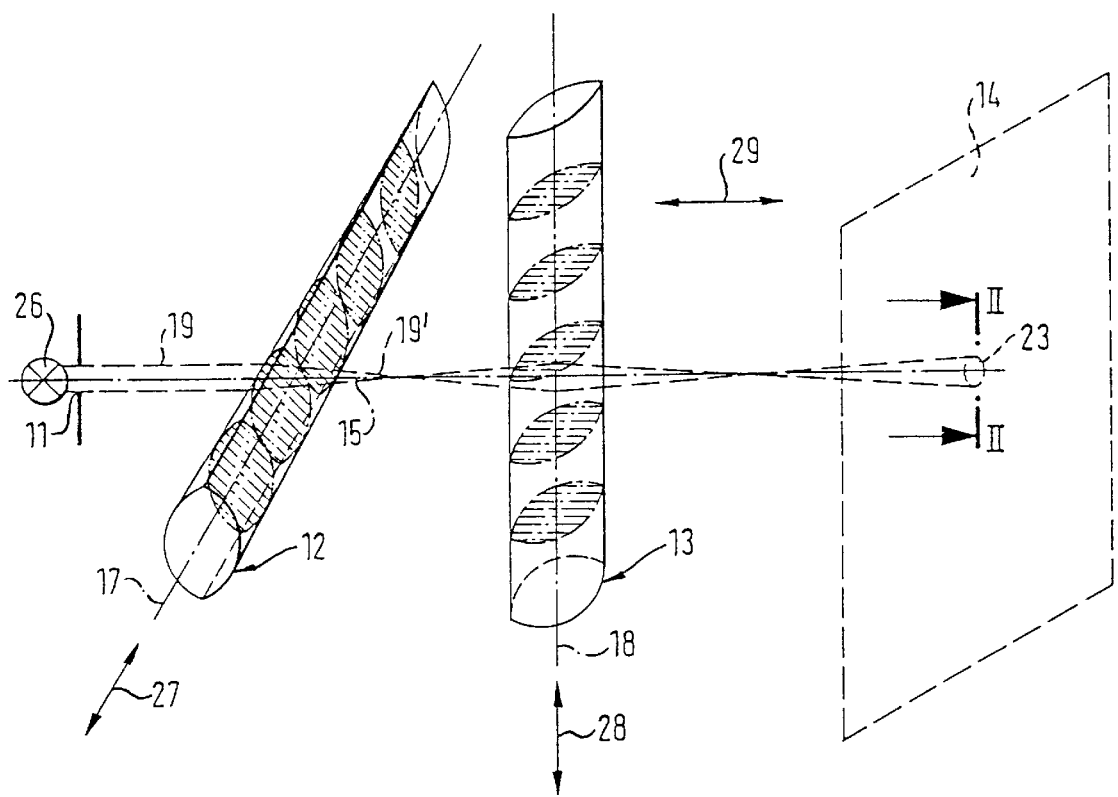
FIG. 1 is a schematic perspective illustration of the basic principle of the light bead generating apparatus of the invention with two straight cylindrical lenses.

In accordance with FIG. 1 a narrow, parallel image forming light beam 19 of circular cross sections starts from a point light source 11 symbolized as a gap with an incandescent lamp 26 arranged behind it, with the image forming light beam having a diameter of 0.5 to 1 mm and striking a cylindrical lens 12 perpendicular to its cylinder axis 17 and also parallel to its optical axis 15 which stands perpendicular to the cylinder axis 17.

At a small distance behind the first cylindrical lens 12 there is located a second cylindrical lens 13 whose cylinder axis 18 stands at a right angle relative to the cylinder axis 17 of the first cylindrical lens 12 and which is likewise so arranged with its optical axis that the image forming light beam 19' which emerges from the cylindrical lens 12 strikes onto the surface of the cylindrical lens 13 parallel to the optical axis 15. At a distance behind the second cylindrical lens 13 there is provided an image surface 14 on which the two crossed cylindrical lenses 12, 13 jointly generate a light bead 23 which is a sharp image of the point light source 11.

In accordance with the invention the focal length of the cylindrical lenses 12, 13 changes continuously along the cylinder axes 17, 18, which is illustrated by a curvature of the cylindrical lens surfaces, which reduces from one end to the other. Moreover, the two cylindrical lenses 12, 13 are displaceable in the direction of the double arrows 27, 28, i.e. in the direction of the cylindrical lens axes 17 and 18 respectively in such a way that points of different focal length can be selectively shifted to the position of the image forming light beam 19, 19'.

Figure 2A:
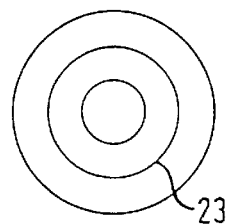
FIGS. 2*a* and 2*b* are views of light beads generated at the image surface in the direction of the line II—II of FIG. 1, such as can be generated by different displacements of the two cylindrical lenses in accordance with FIG. 1.
Figure 2B:
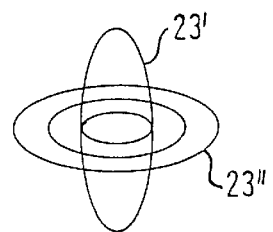

The manner of operation of the described light bead generating apparatus is as follows:

Through a suitable shift of the cylindrical lenses 12, 13 in the direction of the double arrows 27, 28, a desired focal length of the cylindrical lenses 12, 13 can in each case be selected for the image forming light beam 19, 19' in such a way that either circular light beads 23 of different sizes can be realized in accordance with FIG. 2a or elliptical light beads 23', 23" of different sizes can be realized in accordance with FIG. 2b. In order to obtain circular light beads 23 of different sizes in accordance with FIG. 2a, the focal lengths of the cylindrical lenses 12, 13 must have the same focal length at the points at which they are traversed by the image forming light beams 19, 19'. The elliptical light beads 23', 23", having different eccentricities in accordance with FIG. 2b, can be obtained if the image forming light beams 19, 19' traverse points of the two cylindrical lenses 12, 13 having different focal lengths to a greater or lesser degree.

In order to obtain a trouble-free sharp image of the light beads 23, 23', 23" on the image surface 14, the overall arrangement consisting of the cylindrical lenses 12, 13 of the point light source 11 can be displaceably mounted on a suitable holder in the direction of the double arrow 29, i.e. of the optical axis 15. However, the linear shift of the cylindrical lenses 12, 13 in the direction of the double arrows 27, 28 must remain possible.

Figure 4:
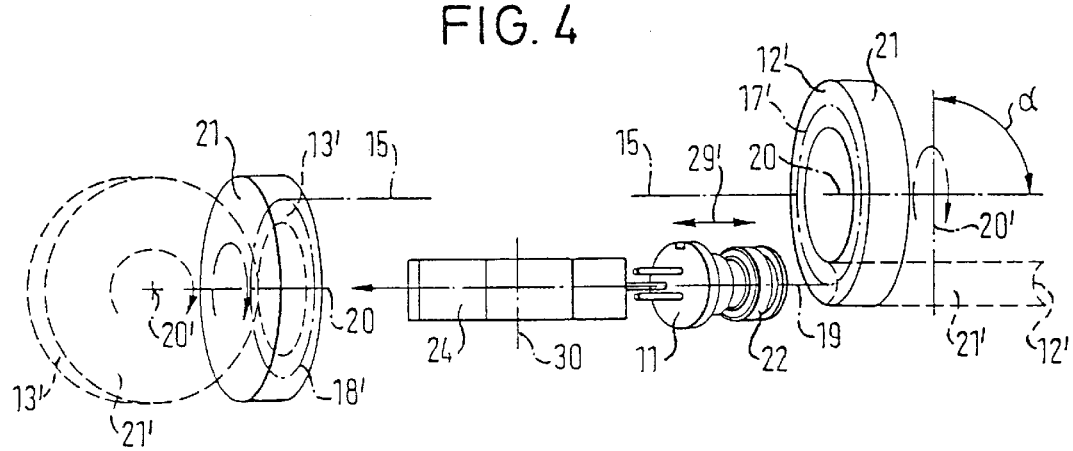
FIG. 4 is a view of the subject of FIG. 3 in the direction of the arrow IV of FIG. 3.
Figure 3:
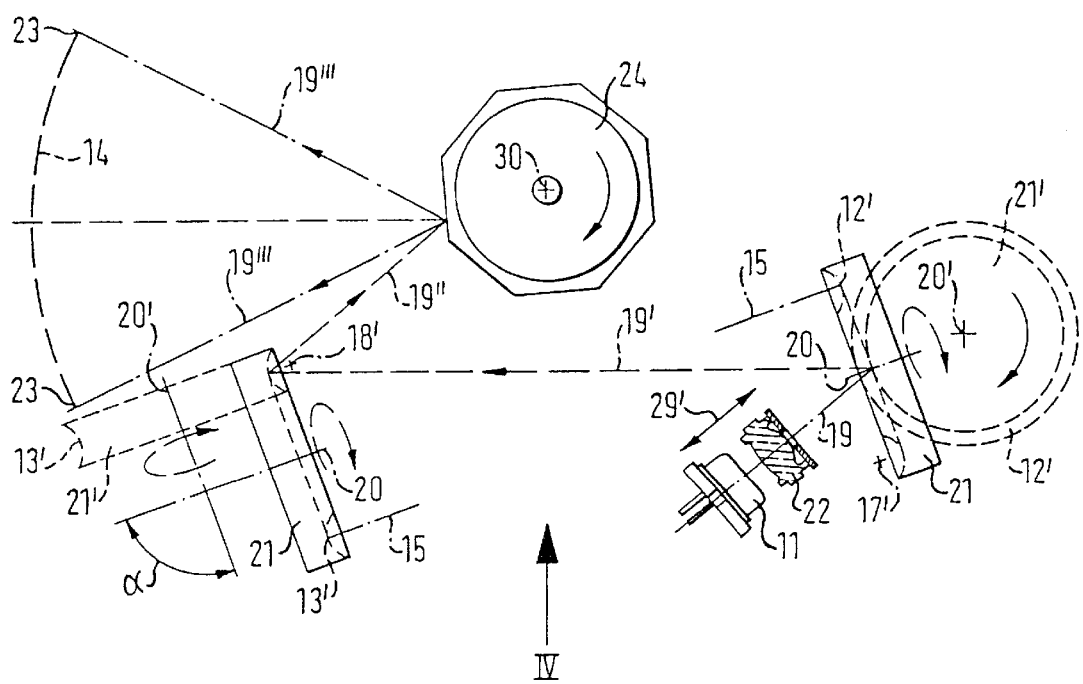
FIG. 3 is a view in the direction of the axis of a mirror wheel of a light bead generating apparatus which operates with two circular, cylindrical mirror discs in accordance with the invention, with a mirror wheel as the light deflecting apparatus and with a further embodiment being shown in broken lines.

In the preferred embodiments of FIGS. 3 and 4 a laser diode 11 generates the image forming light beam 19 via a beam broadening optical system 22, which strikes the marginal region of a circular, cylindrical mirror disc 21 at an angle of ca. 20°, the disc being rotatable about an axis of rotation 20 standing perpendicular to the circular plane. In the edge region of the circular disc 21, which is illuminated by the image forming light beam 19, there is located a circular cylindrical mirror 12 arranged concentrically to the axis of rotation 20, with a circular cylinder axis 17'.

Figure 5:
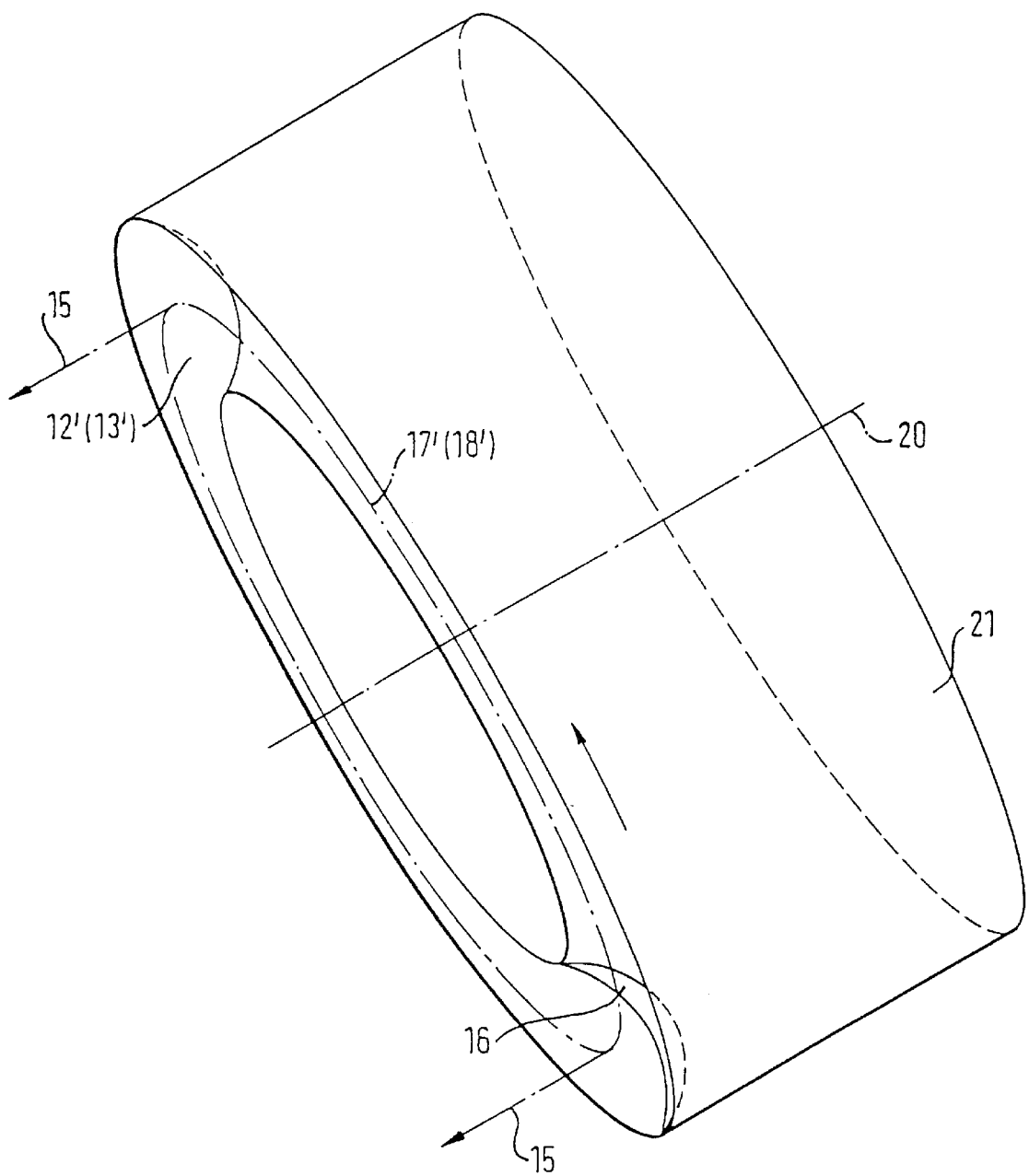
FIG. 5 is a perspective view of a circular, cylindrical mirror disc in accordance of the invention as seen from the front in an enlarged scale.

In accordance with FIG. 5 the radius of curvature of the cylindrical mirror 12' changes continuously in the direction of the circumference and indeed in the direction of the arrow in the reducing sense, so that at one point 16 of the periphery a jump in curvature, i.e. a step change, takes place. In this manner the focal length of the cylindrical mirror 12' increases continuously in the circumferential direction in the direction of the arrow. The radii of curvature can, for example, change continuously from 300 mm to 1200 mm.

Thus, at each point of the circumference there is a cylindrical mirror region of different focal length, with the optical axis 15 of each of these regions extending parallel to the axis of rotation 20.

In accordance with FIGS. 3 and 4 the image forming light beam 19 is reflected at a circumferential point of the cylindrical mirror 12' and reaches the marginal region of a further, similar circular, cylindrical mirror disc 21, as an image forming light beam 19' which has already been influenced by the cylindrical mirror 12', with the further similar circular, cylindrical mirror disc 21 likewise being rotatable about an axis of rotation 20 parallel to the optical axes 15 and being arranged parallel to the first cylindrical mirror 12'. The circular cylindrical mirror axis 18' again extends concentrically to the axis of rotation 20 of the cylindrical lens 13'.

It is important that at the point of incidence of the image forming light beam 19' the cylindrical axis 18' of the cylindrical mirror 13' stands normal to the optical axis 17' of the cylindrical mirror 12' at the point of incidence of the image forming light beam 19, i.e. is crossed relative to it, so that the two illuminated cylindrical mirror regions jointly have the action of a spherical lens. As one can recognize from FIGS. 3 and 4, the two cylindrical mirrors 12', 13' are thus respectively illuminated by the image forming light beams 19 and 19' at two points displaced by 90° relative to one another.

The image forming light beam 19' is reflected as an image forming light beam 19" from the cylindrical mirror 13' to a mirror wheel 24, the axis of rotation 30 of which stands perpendicular to the plane defined by the image forming light beams 19, 19', 19". The light beam 19'" reflected by the mirror wheel 24 executes a V-shaped scanning movement as a result of the rotation of the mirror wheel 24 in the direction of the arrow and generates the desired light bead 23 on a concavely arched image surface 14. By suitable rotation of the two cylindrical mirrors 12', 13' about the axes of rotation 20, 20' it is possible to realize different focal lengths of the cylindrical mirrors 12', 13' and thus to achieve different sizes and shapes of the light bead 23 in the sense of FIGS. 2a and 2b.

Figure 6:
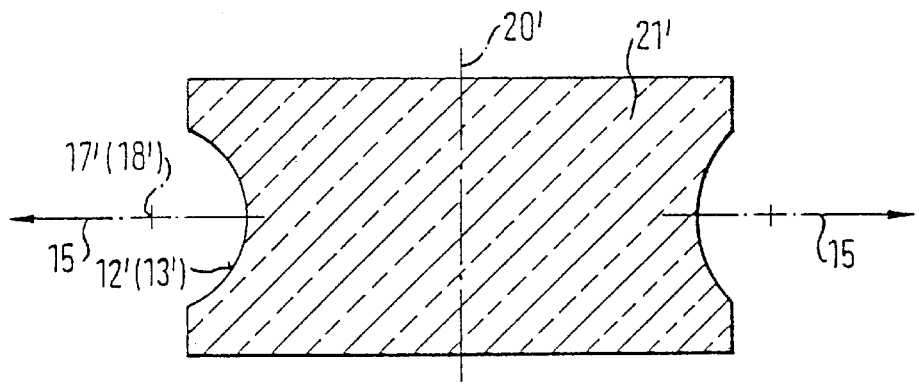
FIG. 6 is an enlarged axial section of an embodiment of a circular, cylindrical mirror disc such as is shown in broken lines in FIGS. 3 and 4.

Whereas, in accordance with the illustration in continuous lines in FIGS. 3 and 4, the circular, cylindrical mirror discs 21 of FIG. 5 are so formed that the channel-like cylindrical mirror 12' or 13' is located on an end phase of the circular disc, in such a way that the optical axis 15 at each point of the circumference extends parallel to the axis of rotation 20, or perpendicular to the relevant end face of the circular disc 21, it is possible, in accordance with the broken line illustrations in FIGS. 3 and 4 or in accordance with FIG. 6, to design the circular, cylindrical mirror disc 21' also in such a way that the cylindrical mirrors 12', 13' are located on the outer circumference of the circular, cylindrical mirror discs 21. In this case the optical axes 15 at each circumferential position represent extensions of the radii of the circular disc 21' at this point. The cylindrical mirror axes 17' and 18' respectively are again circles concentric to the axis of rotation 20', which are, however, located somewhat radially outside of the outer circumference of the circular, cylindrical mirror disc 21'.

When arranged in the beam path of FIGS. 3 and 4, the rotational axes 20' of the circular, cylindrical mirror disc 21' must stand perpendicular to the axis of rotation 20 of the embodiment shown in solid lines. In other respects, the condition also applies here that the points on the circumference of the circular disc 21' which are struck by the image forming light beams 19, 19' are displaced relative to one another by 90° respectively.

Figure 7:
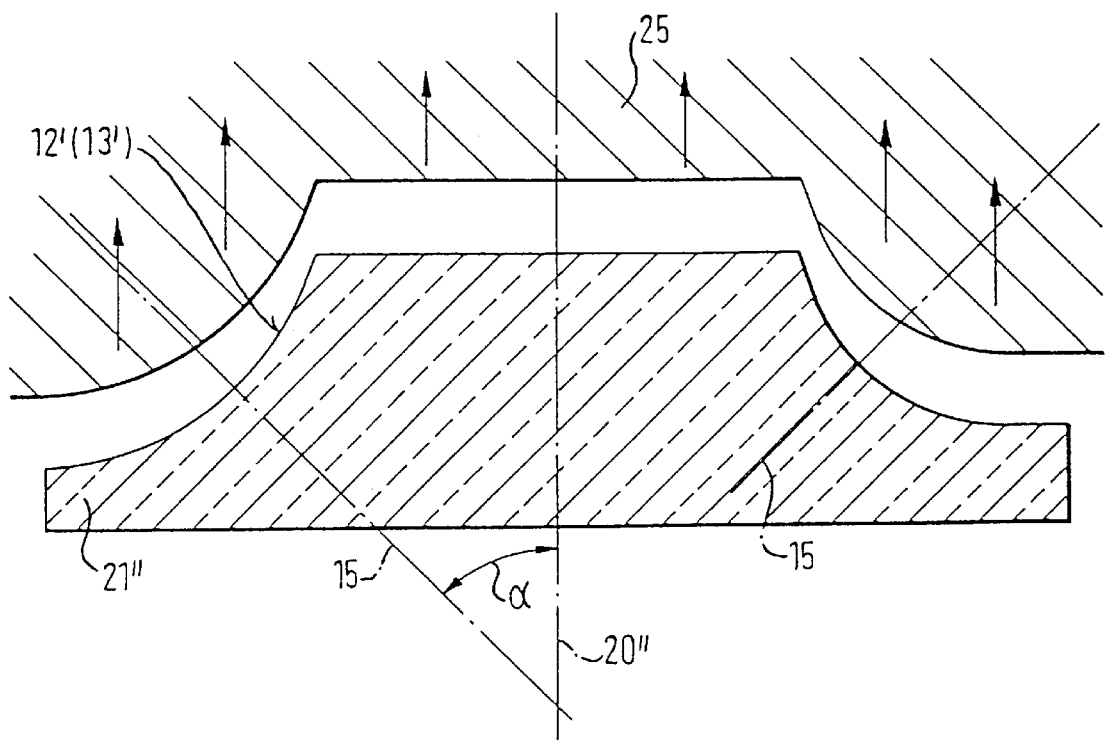
FIG. 7 is an axial section analogous to FIG. 6 of a further embodiment of a circular, cylindrical mirror disc, with one half of the mold half used during the injection molding process being additionally illustrated during the axial extraction from the injection molded circular, cylindrical mirror disc.

The cylindrical mirrors 12', 13' can, however, also be so arranged on the circumference of a circular, cylindrical mirror disc 21" in the manner which can be seen from FIG. 7. In this case, the optical axes 15 at each circumferential position stand, for example, at an angle α of 45° relative to the axis of rotation 20". Any other angle α (see also FIGS. 3 and 4) between 0° and 90° is also conceivable.

The embodiment of FIG. 7 has the advantage that when manufacturing the circular, cylindrical mirror disc 21" in an injection mold, the mold half forming the cylindrical mirror 12' or 13' can be lifted upwardly without problem away from the circular disc 21" in the direction of the axis of rotation 20". It is accordingly expedient to design the circular, cylindrical mirror disc 21" in such a way that no undercuts are present relative to the axis of rotation 20, so that the circular disc 21" can be manufactured in a single injection molding process without burrs.

In the preferred embodiment of the circular light bead generating apparatus of the invention with circular, cylindrical mirror discs 21, 21', 21", the decisive advantage lies in the fact that the different focal length settings of the two cylindrical lenses 12', 13' can not only be realized independently of one another, but also by a simple rotational movement about the axes 20, 20', 20".

In order to make the light bead sharp, the arrangement consisting of the laser diode 11 and the beam widening optical system 22 can be displaceably arranged in the direction of the double arrow 29' in accordance with FIGS. 3 and 4.

What is claimed is:

1. Light bead generating apparatus, having a point light source and a variable optical system of variable focal length by means of which the point light source is imaged, via a light deflecting device, at an image surface with a magnification scale predetermined by the variable optical system, characterized in that the variable optical system is formed by first and second crossed cylindrical optical systems with variable focal length in the direction of their cylindrical axes which are displaceably connected in the direction of their cylinder axes and are sequentially illuminated by image forming light beams at points where the cylinder axes of the two cylindrical optical systems stand optically perpendicular to one another.

2. Light bead generating apparatus in accordance with claim 1, characterized in that at least one of the cylindrical optical systems comprises a cylindrical lens.

3. Light bead generating apparatus in accordance with claim 1, characterized in that at least one of the cylindrical optical systems comprises a cylindrical mirror.

4. Light bead generating apparatus in accordance with claim 3, characterized in that the cylindrical mirrors have only one sense of inclination relative to the axis of rotation in each axial section.

5. Light bead generating apparatus in accordance with claim 1, characterized in that the cylindrical axes of the cylindrical optical systems are straight.

6. Light bead generating apparatus in accordance with claim 1, characterized in that the cylindrical axes of the cylindrical optical systems are circular and are rotatable about a central axis of the circle as an axis of rotation.

7. Light bead generating apparatus in accordance with claim 6, characterized in that the cylindrical optical systems are provided in a marginal region of a round disc.

8. Light bead generating apparatus in accordance with claim 6, characterized in that the optical axes of the cylindrical optical systems extend at each point of the cylindrical axes at an angle of 0° to 90° relative to the axis of rotation.

9. Light bead generating apparatus in accordance with claim 8, characterized in that the optical axes of the cylindrical optical systems extend parallel to the axis of rotation.

10. Light bead generating apparatus in accordance with claim 8, characterized in that the optical axes of the cylindrical optical systems extend perpendicular to the axis of rotation.

11. Light bead generating apparatus in accordance with claim 8, characterized in that the optical axes of the cylindrical optical systems extend at an angle of 30° to 60° to the axis of rotation.

12. Light bead generating apparatus in accordance with claim 10 wherein the optical axes of the cylindrical optical systems extend at an angle of approximately 45°.

13. Light bead generating apparatus in accordance with claim 1, characterized in that the change in focal length takes place continuously along the cylinder axes.

14. Light bead generating apparatus in accordance with claim 13, characterized in that the change in focal length continuously increases or decreases along the cylinder axes.

15. Light bead generating apparatus in accordance with claim 13, with circular cylindrical optical systems, characterized in that a step change of the focal length takes place at one point of the circumference.

16. Light bead generating apparatus in accordance with claim 1, characterized in that the cylindrical optical systems have part circular surfaces in each section plane perpendicular to the cylinder axis.

17. Light bead generating apparatus in accordance with claim 16, characterized in that the radius of the part circles changes along the cylinder axes from 10 to 200 cm.

18. Light bead generating apparatus in accordance with claim 17 wherein the radius of the part circles changes along the cylinder axes from between 20 to 150 cm.

19. Light bead generating apparatus in accordance with claim 18 wherein the radius of the part circles changes along the cylinder axes from 30 to 120 cm.

20. Light bead generating apparatus in accordance with claim 1, characterized in that the cylindrical optical systems are illuminated by the image forming light beam obliquely to the optical axis and in a plane which stands normal to the cylinder axis.

21. Light bead generating apparatus in accordance with claim 1, characterized in that the point light source is a laser diode and including a beam widening optical system.

* * * * *